(12) United States Patent
Koskelainen (10) Patent No.: US 7,991,894 B2
(45) Date of Patent: Aug. 2, 2011

(54) METHOD AND TERMINAL DEVICE FOR TRANSMITTING AND RECEIVING ATTACHMENT DATA

(75) Inventor: Petri Koskelainen, Tampere (FI)

(73) Assignee: Nokia Corporation, Espoo (FI)

( * ) Notice: Subject to any disclaimer, the term of this patent is extended or adjusted under 35 U.S.C. 154(b) by 1813 days.

(21) Appl. No.: 10/469,787

(22) PCT Filed: Mar. 5, 2001

(86) PCT No.: PCT/EP01/02473
§ 371 (c)(1),
(2), (4) Date: Nov. 18, 2003

(87) PCT Pub. No.: WO02/071721
PCT Pub. Date: Sep. 12, 2002

(65) Prior Publication Data
US 2004/0107235 A1 Jun. 3, 2004

(51) Int. Cl.
G06F 15/16 (2006.01)
H04L 12/16 (2006.01)
(52) U.S. Cl. ......... 709/227; 709/204; 709/228; 370/260
(58) Field of Classification Search .......... 709/230–238, 709/246, 203–207, 227–228; 370/25–260, 370/352
See application file for complete search history.

(56) References Cited

U.S. PATENT DOCUMENTS

| | | | |
|---|---|---|---|
| 6,400,942 B1 * | 6/2002 | Hansson et al. | 455/426.1 |
| 6,757,732 B1 * | 6/2004 | Sollee et al. | 709/227 |
| 6,977,921 B1 * | 12/2005 | Dolan | 370/352 |
| 7,035,902 B1 * | 4/2006 | Bates et al. | 709/206 |
| 7,277,533 B2 * | 10/2007 | Gilleland | 379/201.01 |
| 2002/0034166 A1 * | 3/2002 | Barany et al. | 370/329 |
| 2004/0215787 A1 * | 10/2004 | Gibson et al. | 709/227 |
| 2005/0117576 A1 * | 6/2005 | McDysan et al. | 370/389 |
| 2007/0058656 A1 * | 3/2007 | Breslow et al. | 370/437 |
| 2007/0242810 A1 * | 10/2007 | Gilleland | 379/88.21 |

OTHER PUBLICATIONS

Adam Roach, SIP in 3GPP, Aug. 12, 2000, pp. 1-18 http:// www.cs. columbia.edu /sip /talks /SIP3GPP.ppt.*
Donovan, Steve, The SIP Info Method, Internet Draft, Oct. 1999, pp. 1-10.*
MMUSIC WG: Handley et al, "draft-ietf-sip-rfc2543bis-00.ps—SIP: Session Initiation Protocol", Internet Engineering Task Force, Jun. 5, 2000, pp. 1-129, XP002164649.
N. Freed et al, First Virtual: "Multipurpose Internet Mail Extensions (MIMME) Part Two: Media Types, RFC 2046", Network Working Group, Nov. 1996, pp. 1-44, XP001022150.
S. Donovan, "The SIP Info Method", IETF Request for Comments, Oct. 2000, pp. 1-9, XP002167974.

* cited by examiner

*Primary Examiner* — Joshua Joo
(74) *Attorney, Agent, or Firm* — Harrington & Smith (57) ABSTRACT

The invention relates to a method and a device for transmitting and receiving attachment data of extra attachments in session initiation messages of a session initiation protocol that is defined to initiate, maintain and terminate sessions with one or more terminals in a network. As the available space is limited for such attachments in a session initiation message the invention proposes to fragment the attachment data in attachment fragments and attach the attachment fragments to successive session initiation messages. Thereby the size of attachment data is increased considerably.

40 Claims, 5 Drawing Sheets

METHOD AND TERMINAL DEVICE FOR TRANSMITTING AND RECEIVING ATTACHMENT DATA

FIELD OF THE INVENTION

The present invention relates to a method and a terminal device for transmitting and receiving attachment data of extra attachments in session initiation messages of a session initiation protocol.

BACKGROUND OF THE INVENTION

In UMTS (Universal Mobile Telecommunications System) SIP (Session Initiation Protocol) is used to establish multimedia sessions or calls, in particular VoIP (Voice over Internet Protocol) sessions. A multimedia session is generally defined as a set of multimedia senders and receivers whereby data streams flowing from senders to receivers. Multimedia sessions include internet multimedia conferences, internet telephone calls and multimedia distribution.

The session initiation protocol is a request-response control (signaling) protocol for initiating, maintaining and terminating sessions with one or more participants (senders and receivers) or terminal devices. The session initiation protocol is an application level protocol which is used in packet switched environments, e.g. GPRS (General Packet Radio Service) system, UMTS or packet cable (USA cable modem standard) systems. The session initiation protocol can be used in any reliable or unreliable protocol, including UDP (User Datagram Protocol), SCTP (Stream Control Transmission Protocol) and TCP (Transmission Control Protocol).

The session initiation protocol uses session initiation messages to negotiate between participants or terminal devices. A session initiation message comprises a SIP method. Furthermore, a session initiation message can comprise further content as an extra attachment, such as MIME (Multipurpose Internet Mail Extensions) content, e.g. images, video and audio files.

MIME is an extension of the internet e-mail protocol SMTP (Simple Mail Transfer Protocol). MIME is used to facilitate and standardize the transmission of images and audio files such as voice mails and other binary files, in particular files that are not text files. In general, MIME-names are used to describe the content whether it is text or binary. MIME-name is used in Content-Type header which describes the MIME-type of the content. The content may be e.g. text/plain, image/gif, or audio/mp3.

Thus, it is known that session initiation messages may include MIME content. However, the size of such content, i.e. amount of attachment data of such extra attachments is limited due to a predetermined maximum size of the underlying protocol. In particular, currently in many environments SIP messages can carry only approximately 600 bytes sized MIME attachments. This is because UDP is used as an underlying transmission protocol.

SUMMARY OF THE INVENTION

It is therefore an object of the present invention to enable the transmission of larger attachments.

This object is achieved by a method for transmitting attachment data of attachments in session initiation messages of a session initiation protocol, said protocol being defined to initiate, maintain and terminate sessions with one or more terminals in a network, wherein said attachment data is fragmented in attachment fragments and said attachment fragments are attached to successive session initiation messages.

Furthermore, the above object is achieved by a method for receiving attachment data of attachments in session initiation messages of a session initiation protocol, said protocol being defined to initiate, maintain and terminate sessions with one or more terminals in a network, wherein said attachment data is separated from successive session initiation messages and defragmented from thus obtained attachment fragments.

Furthermore, the above object is achieved by a terminal device for transmitting attachment data of attachments in session initiation messages of a session initiation protocol, said protocol being defined to initiate, maintain and terminate sessions with one or more terminals in a network, comprising:
   transmitting means for transmitting said messages,
   session initiation means for initiating sessions with one or more terminal devices in said network,
   fragmentation means for fragmenting said attachment data in attachment fragments, and
   attaching means for attaching said attachment fragments to successive session initiation messages.

Furthermore, the above object is achieved by a terminal device for receiving attachment data of attachments in session initiation messages of a session initiation protocol, said protocol being defined to initiate, maintain and terminate sessions with one or more terminals in a network, comprising:
   receiver means for receiving said messages,
   session initiation means for initiating sessions with one or more terminal devices in said network,
   separation means for separating said attachment data from successive session initiation messages thus obtaining attachment fragments, and
   defragmentation means for defragmenting said attachment fragments.

The main idea of the invention is to spread a large attachment over successive SIP messages by fragmenting such an attachment into a number of attachment fragments and attaching said attachment fragments one by one to a corresponding number of successive session initiation messages thereby attaching each fragment to a different message. In a similar manner such a spread attachment is regenerated by splitting each message of that series of successive session initiation messages, thereby separating SIP methods and attachment data in order to obtain the attachment fragment and defragmenting the attachment fragments into the original attachment.

Thus, the invention enables to transmit much larger attachments in session initiation messages, in particular 2 to 5 times larger attachments. Due to the invention it is possible to transmit really dashing images or animations before or at the beginning of a session.

Preferably, the attachment fragments are attached to a first group of successive initiation messages that are sent from a first terminal device or a caller to a second terminal device or a callee before said second terminal device starts alerting, in particular a phone starts ringing. Thus, it is possible to transmit the attachment before the phone of the callee starts ringing which is advantageously as it enables to provide the callee with additional information about the forthcoming call.

In a further preferred embodiment, attachment fragments are attached to a second group of successive session initiation messages as well, whereby said second group of session initiation messages is sent from the first terminal device to said second terminal device after said second terminal device has started alerting. Thus, it is possible to further enlarge the maximum size of attachments, since thus more messages can be used to carry attachment fragments.

In a still further preferred embodiment, a session initiation message is only filled up partly with an attachment fragment and spare space is reserved for routing information being added during transmission of said message in the network. Thus, routing information can be added during transmission of a message without exceeding the maximum size of the message.

Further advantageous developments are defined in the dependent claims.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
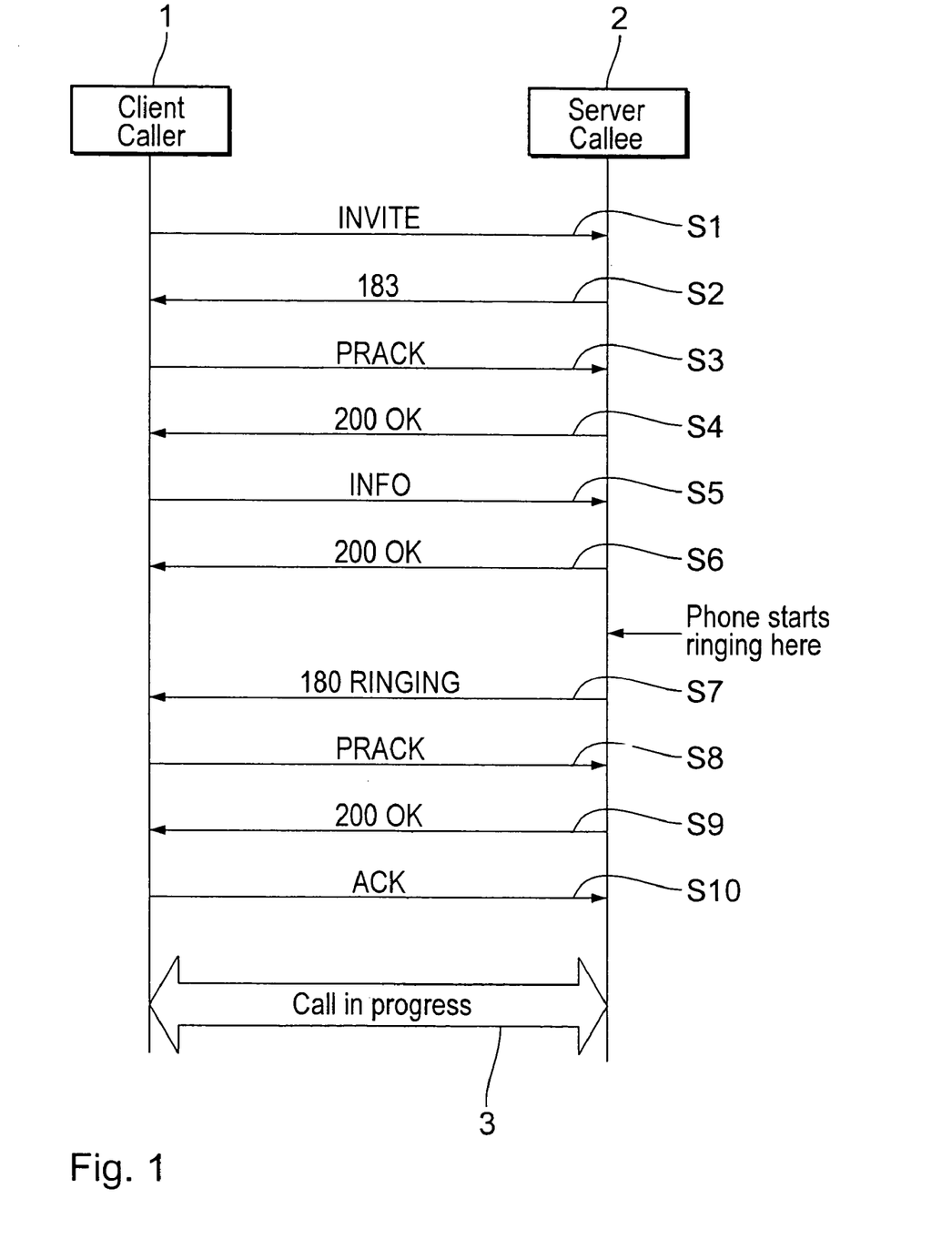
FIG. 1 shows a message signaling diagram for establishing a multimedia call.

FIG. 1 shows a message signaling diagram when a participant of a packet switched network is in progress to establish a session with another participant. A caller 1 or in more general terms a client terminal wishes to begin a session with a callee 2 or in more general terms a server terminal. The caller 1 starts initiating the session by sending a SIP INVITE message to the callee 2 according to step S1. Callee 2 responds to the SIP INVITE message by returning a SIP provisional response message, namely a SIP 183 session progress message to the caller 1 according to step S2.

In response to that SIP 183 session progress message the caller 1 sends a further SIP message, namely a SIP PRACK message to the callee 2 according to step S3 in order to confirm receipt of the SIP provisional response message, namely the SIP 183 session progress message. The callee 2 confirms the SIP PRACK message by returning a SIP 200 OK message to the caller 1 according to step S4.

In response to the SIP 200 OK message the caller 1 sends an SIP INFO or SIP COMET message to the callee 2 according to step S5 providing additional optional information, e.g. transmitting a status of a precondition as "success" or "failure". The callee 2 responds to the SIP INFO or SIP COMET message with a SIP 200 OK message according to step S6.

At this point the terminal device of the callee 2 starts alerting, in particular a called phone starts ringing. Up to now the callee has received three SIP messages, namely an SIP INVITE message, a SIP PRACK message, and a SIP INFO or SIP COMET message.

The callee 2 indicates that its terminal device or phone is ringing by sending a SIP 180 RINGING message to the caller 1. Furthermore, that SIP 180 RINGING message indicates to the caller 1 that the caller 1 should be given a ringback call progress tone. The SIP 180 RINGING message is indicating in FIG. 1 by step S7. The ringback is a signaling tone produced by a calling client's application indicating that a called party is being alerted.

In response to that SIP 180 RINGING message the caller 1 sends a further SIP PRACK message to the callee 2 to acknowledge receipt of the SIP 180 RINGING message according to step S8. The callee 2 acknowledges the SIP PRACK message with a SIP 200 OK message according to step S9.

The caller 1 acknowledges the SIP 200 OK message with a SIP ACK message and exchanges NCS (Network Call Signaling) signaling instructing to stop local ringback and enable full duplex connection as being indicated by step S10. Now the call is "cut through" or is in progress as being indicated by reference numeral 3.

The message signaling described with reference to FIG. 1 indicates that there are five SIP messages (INVITE, 2×PRACK, INFO or COMET, and ACK) sent from the caller 1 to the callee 2. Three of these SIP messages, namely INVITE, PRACK, and INFO or COMET message, are sent and received before the phone of the callee starts ringing. Accordingly, two of these SIP messages, namely PRACK and ACK message, are sent and received after the phone has started ringing. Each of said SIP messages have the same basic structure.

Figure 2:
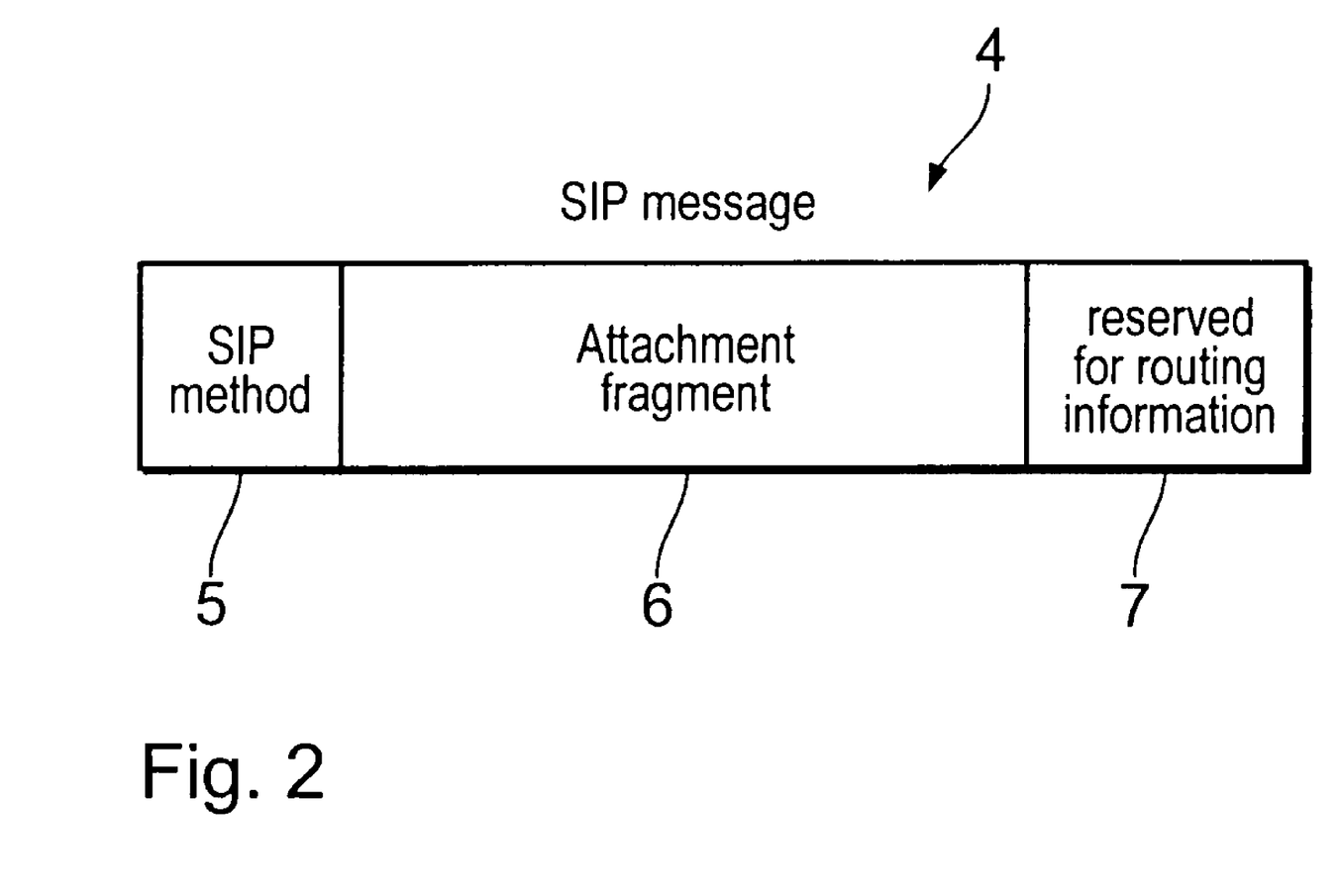
FIG. 2 shows a schematic diagram of a session initiation protocol message.

FIG. 2 shows the principle structure of a SIP message 4. A SIP message 4 comprises a first portion, namely a SIP method 5 being the main element of the SIP message 4. However, a SIP message 4 may contain further data up to a certain maximum predetermined size. The entire size of a SIP message is limited by the maximum admissible size of a datagram that can be transmitted in the network connecting the caller 1 and the callee 2, in particular a network supporting packet switched transmission of data units such as UMTS or GPRS.

According to the above, a SIP message can contain, besides the SIP method 5, further data such as data of extra attachments transmitted via the network by SIP messages. The attachment data 6, however, should be of a size not larger than the maximums available size of the SIP message 4 deducted by the size of the SIP method 5. Therefore, only a part of a large attachment is transmitted in a SIP message 4, namely only an attachment fragment 6.

As the size of a SIP message 4 may increase during the transmission of the SIP message 4 in the network, because new via headers are added, the size of the attachment fragment 6 is not the maximum possible size remaining after a SIP method 5 has been incorporated in a SIP message 4, namely the maximum available size of a SIP message 4 deducted by the size of the SIP method 5, but spare space 7 is reserved for routing information such as new via headers.

The size of the spare space 7 reserved for routing information can be anticipated before hand. If the size of a SIP message 4 nevertheless exceeds the maximum packet size of a datagram in UDP during the route through the network, it is still likely that UDP fragmentation takes care of it in a core network. If however, the size is increase inadmissibly such a data packet gets lost and standard SIP reliability mechanism are applied and a reason error code is returned to the caller 1.

The sending of such a failed method that didn't reach the callee or destination can be repeated after a retransmission timer in the sending terminal expires. The timer expiry indicates e.g. that the method could not be delivered due to message size limitation.

Figure 3:
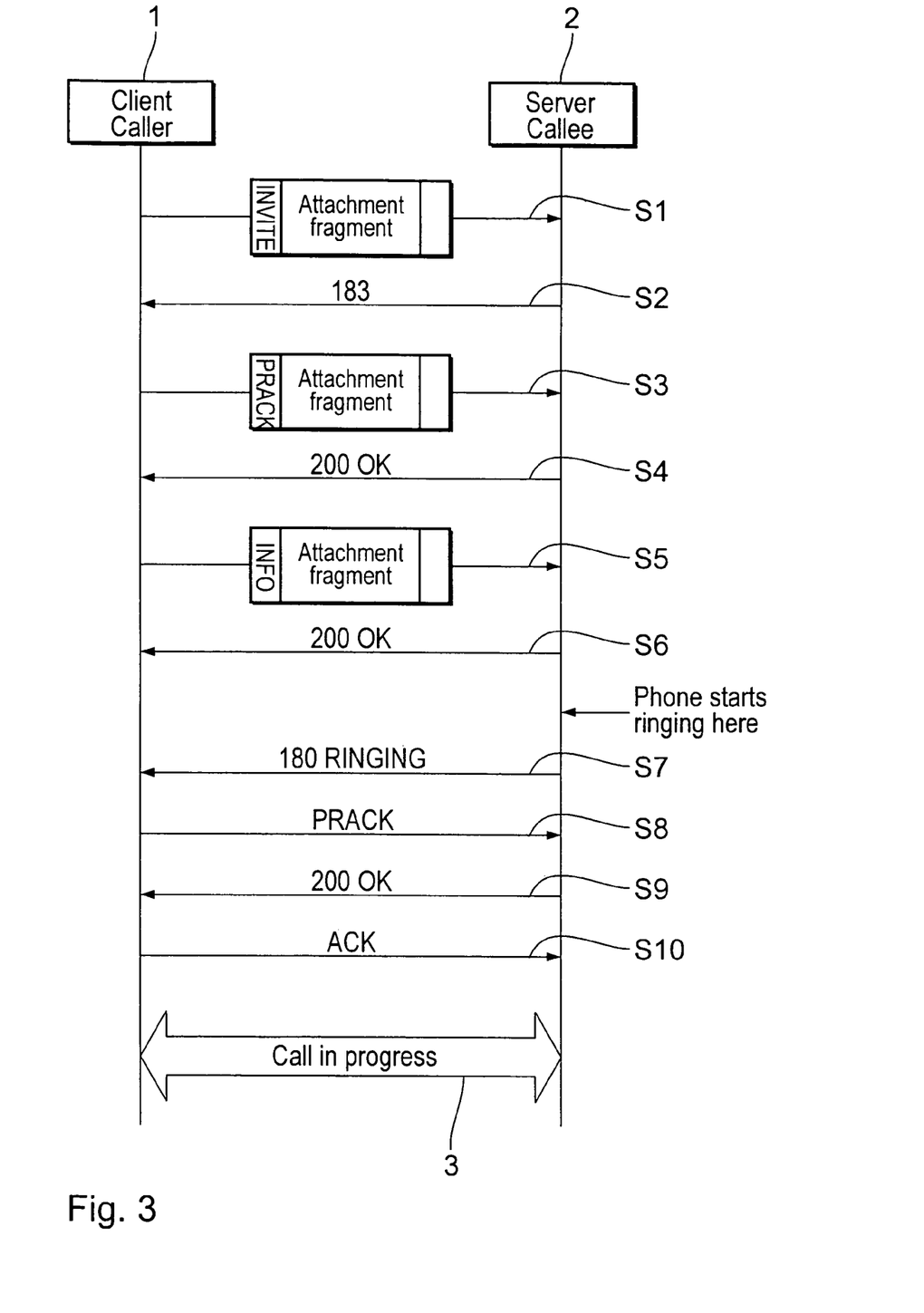
FIG. 3 shows a message signaling diagram for establishing a multimedia call according to a first embodiment of the invention.
Figure 4:
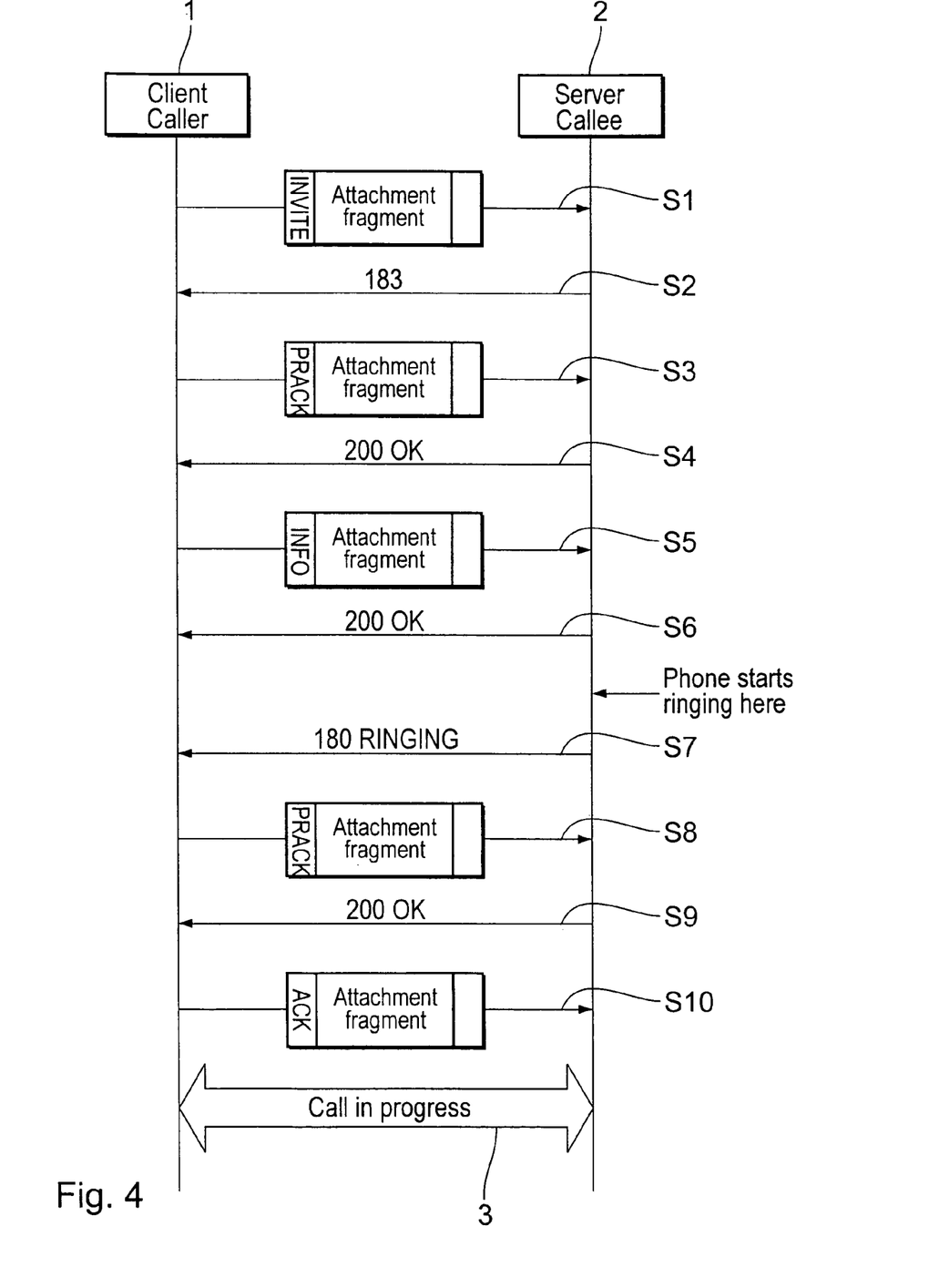
FIG. 4 shows a message signaling diagram for establishing a multimedia call according to a second embodiment of the invention.

FIGS. 3 and 4 show further message signaling diagrams basically similar to the diagram of FIG. 1, thus same numerals indicate similar elements or steps with the differences described hereinafter.

FIG. 3 illustrates that the SIP INVITE message according to step S1, the SIP PRACK message according to step S3 and the SIP INFO or SIP COMET message according to step S5 are of the structure indicated in FIG. 2. Thus, an attachment is spread over a first group of e.g. three successive SIP messages by fragmenting that attachment and attaching or multiplexing same over said messages.

Thus, an extra attachment can be transmitted in standard SIP messages without the need of additional data traffic. Moreover, such attachments, like images, can be displayed on imaging capable phones at the callee's end. Thus, the callee receives additional visual information with regard to the actual call, in particular even before his phone starts ringing. Alternatively or additionally other content than images may be transmitted via the attachments such as audio or video attachments or simple text messages.

The method of attaching just portions of an attachment or just attachment fragments to SIP messages or multiplexing an attachment over three successive SIP messages as being indicated in FIG. 3 enables to transmit attachments of at least three times the amount of data which can be attached to a regular SIP message. In particular, it is possible to transmit about 2200 bytes available for the attachment assuming that this content is needed before the phone of callee 2 starts ringing.

Due to the fact that the sizes of a SIP PRACK, SIP INFO or SIP COMET method are respectively much smaller than the size of a SIP INVITE method the improvement is larger than three times the available size of an INVITE message. Thus, the invention more than triples the amount of attachment data which can be sent before callees phone starts alerting, from 600 bytes at least to about 2200 bytes. The SIP INVITE, PRACK and INFO or COMET messages form a guaranteed logical semi-message which is known before hand and thus can be used as a single big message which includes the fragmented sub-parts of the attachment content. Thus, at least 2200 bytes of attachment data can be transmitted enabling really useful content, e.g. colorful images or animations.

Preferably the first group of messages consists of the sequence of messages that are always sent during the initiation of successful sessions. This first group particularly comprises the INVITE messages for inviting the second terminal 2 or callee to participate in a session as well as the PRACK message for acknowledging the session parameters indicated by the second terminal 2 or callee and/or the INFO or COMET message for indicating successful resource reservation for the session media components.

FIG. 4 shows a further message signaling diagram further increasing the available space for attachment data by using not only the first group of messages, namely the SIP INVITE, PRACK and INFO or COMET message according to steps S1, S3 and S5 before the phone of the callee 2 starts ringing, but uses a second group of messages, namely the SIP PRACK and ACK message according to steps S8 and S10 after the phone has started ringing as well. Thus, it is possible to use all five SIP messages sent from the caller 1 to the callee 2 allowing to attach content of about 4-5 Kbytes.

Using the SIP messages according to step S8 and S10 for the transmission of attachment fragments allows to transmit specific information after the phone of the callee 2 has started ringing. This feature can be useful in certain applications, in particular when specific information is not to be transmitted before the phone of the callee 2 has not started ringing.

Figure 5:
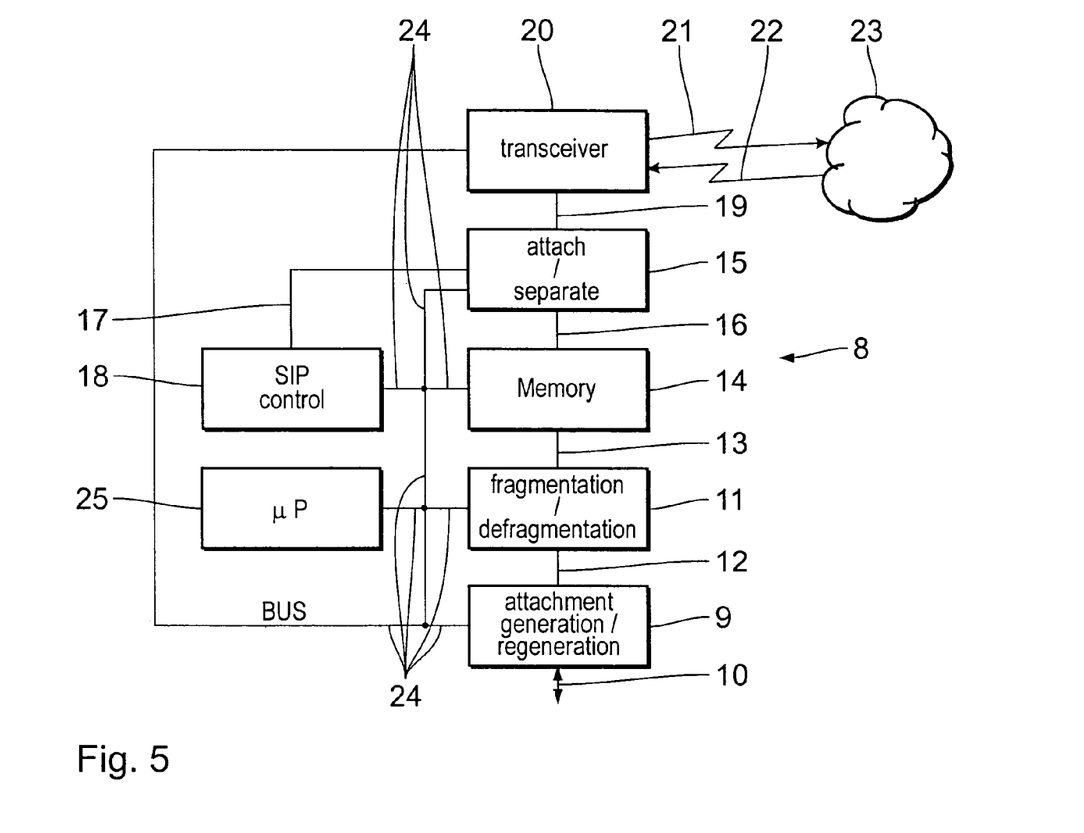
FIG. 5 shows a schematic block diagram of a terminal device according to a preferred embodiment of the invention.

FIG. 5 shows a schematic block diagram of a terminal device 8 for receiving and transmitting attachment data that is fragmented in attachment fragments whereby said fragments are attached one by one to successive initiation messages respectively and/or multiplexed over successive initiation messages. Within the scope of the invention, such a terminal device 8 may be equipped to just send fragmented attachments spread or multiplexed over successive messages or to just receive fragmented attachments spread or multiplexed over successive messages or to send and to receive fragmented and spread or multiplexed attachment fragments. FIG. 5 illustrates a terminal device that is capable of transmitting as well as receiving such spread or multiplexed attachment fragments.

The terminal device 8 comprises an attachment generator 9 generating MIME type attachments based on files of a standard format received from an application via an input/output interface 10. The attachment generator 9 sends the attachment of the MIME type to a fragmentation unit 11 via an electrical line 12. The fragmentation unit 11 divides the attachment into fragments of a size being not larger than a predetermined maximum attachment fragment size.

The attachment fragments are transmitted via an electrical line 13 to a memory 14 storing the attachment fragments as long as they have not been transmitted to the callee.

Each attachment fragment is next transferred one by one from the memory 14 to an attaching unit and/or a multiplexer 15 via an electrical line 16 attaching the attachment fragments to SIP methods and/or multiplexing the attachment fragments with SIP methods in order to create SIP messages containing that SIP method and one of the attachment fragments. The attaching unit and/or multiplexer 15 is connected via an electrical line 17 with a SIP control unit 18 providing the attaching unit and/or multiplexer 15 with SIP methods.

The attaching unit and/or multiplexer 15 is further connected via an electrical line 19 to an transceiver 20 for transmitting 21 and receiving 22 data to/from a network 23.

The network 23 is preferably a network supporting packets switched transmission of data units as GPRS and UMTS. Preferably it is at least partly a radio network for mobile communications.

The attachment generator 9, the fragmentation unit 11, the memory 14, the attaching unit and/or multiplexer 15, the SIP control unit 18 and the transceiver 20 are connected via an data bus 24 with each other and with a microprocessor 25 coordinating the interactions between said attachment generator 9, fragmentation unit 11, memory 14, attaching unit and/or multiplexer 15, SIP control unit 18 and transceiver 20, in particular to coordinate the timing of interactions between these components.

FIG. 5 is now used to explain the receiving of attachment fragments. If the terminal device 8 receives from the network 23 SIP messages via the transceiver 20 said SIP messages are transmitted via the electrical line 19 to a separation unit and/or demultiplexer or a combined attaching/separation unit and/or multiplexer/demultiplexer 15 using its separation and/or demultiplexer functionality. The separation unit and/or demultiplexer or combined attaching/separation unit and/or multiplexer/demultiplexer 15 divides a received SIP message into a plurality of portions, thereby separating the SIP method in a first portion, an attachment fragment in a second portion and routing information in a third portion. The separated SIP message of the first portion is sent via the electrical line 17 to the SIP control unit 18 in order to initiate further SIP handling.

The attachment fragment according to the second portion is sent via the electrical line 16 to memory 14. Memory 14 stores a number of attachment fragments. After receipt of all attachment fragments belonging to one attachment, in particular after receipt of the first three or five SIP messages the memory 14 transmits the attachment fragments one by one via the electrical line 13 to a defragmentation unit or a combined fragmentation/defragmentation unit 11 using its defragmentation functionality. The defragmentation unit 11 thus defragments the attachment fragments by combining the fragments in order to rebuild the attachment.

The defragmented attachment is then transferred via the electrical line 12 to an attachment regeneration unit or combined generation/degeneration unit 9 with attachment regeneration functionality. This regeneration unit 9 regenerates the original file, i.e. converts the attachment of the MIME type into the original file format. The regenerated file is sent via the input/output interface 10 to an application for further processing.

The attachment regeneration unit 9 or combined generation/degeneration unit 9, the defragmentation unit 11 or combined fragmentation/defragmentation unit 11, the memory 14, the separation unit and/or demultiplexer or combined attaching/separation unit and/or multiplexer/demultiplexer 15, the SIP control unit 18, and the transceiver 20 are connected via data bus 24 with each other and with microprocessor 25 coordinating the interaction between said components, in particular to coordinate the timing of interactions between these components.

All these components including microprocessor 25 or any subset of these components are preferably implemented in one processor/memory arrangement of a terminal device by means of software, i.e. although these components can be implemented by separate hardware means, such implementation is not necessary and these components are preferably software modules of that processor/memory arrangement.

The fragmentation unit 11 and/or the microprocessor 25 are capable of determining an amount of available space in a SIP message for picking up an attachment fragment by analyzing average lengths of SIP methods that are contained in session initiation messages. Thus, the maximum admissible size of attachment fragments is taken into account when fragmenting an attachment into attachment fragments, i.e. selecting an attachment fragment size that is smaller than the maximum admissible size.

Furthermore, the SIP control unit 18 is capable of evaluating a response method or response message received from the network 23 in order to determine whether a called party supports multiplexed and fragmented attachment data. The reason is that it might be possible that certain components of the network 23 or the terminal device of the callee 2 do not support fragmented and/or multiplexed attachment data or do not support MIME multipart/mixed content type.

If this is the case and such a fragmented and/or multiplexed or multipart attachment is sent to the callee 2 the session cannot be established. In this case the callee 2 returns an error code and the caller 1 can resend the SIP INVITE message without the fragmented and/or multiplexed or multipart attachment.

This proceeding can be further optimized: As the first SIP message returned from the callee 2 to the caller 1, e.g. the SIP 183 session progress message includes the knowledge whether multipart is supported the following two SIP messages sent from the caller 1 to the callee 2, e.g. SIP PRACK message and SIP INFO or COMET message can be used together with attachment fragments. If, however, the caller 1 has determined that the callee 2 does not support MIME multipart messages, then no attachment fragments are sent.

Preferably, the attachment fragments are sent using multipart or mixed type messages as the MIME type (content type: Multipart/mixed; boundary=xyz). Inside multipart there can be used several sub-parts, like application/sdp, image/gif, and the proposed attachment fragments, e.g. part one of three is included in the INVITE message, part two of three is included in the PRACK message and part three of three is included in the INFO or COMET message. Any separation and/or multiplex format, new or existing, may be used to split the attachment data.

The above described MIME fragmentation (generally known as MIME message/partial) can be made to adapt itself to any kind of signaling message on the SIP layer. The MIME fragmentation is not bound to certain signaling messages. Therefore, the above described invention is not limited to a certain type of extension format.

Furthermore, a method for calculating the available space for the attachment data is proposed, thereby, the available SIP methods prior to the alerting phase are determined and the space available in them is calculated, e.g. based on an estimation of SDP (Session Description Protocol) content sizes. Thus, the total available space is calculated. If the attachment is not small enough to fit in the INVITE message, it is determined whether it can be fragmented. If it can be fragmented then it is delivered as described above. If, however, it cannot be delivered even via fragmentation, it is delivered using TCP (Transmission Control Protocol). If the determination is performed in the terminal device of the caller 1, the size of the maximum content can be determined prior to sending of the INVITE message. Thus, unnecessary data traffic can be avoided.

Summarized the following steps can be carried out prior to transmission of an attachment: The terminal device of the caller, namely the client determines the signaling methods available for the transmission of the attachment. The determination of the possible methods for the transmission of the attachment or attachment fragments can be based on information on the callee. The information on the callee can be the destination of the call, the callee identify, the domain name within the callee logical name. This information can be used to determine the capabilities of the callee network. This means that it is determined what signaling messages will always be sent during call set-up to the callee in the network of the callee. For instance, it is determined that according to what standards the signaling used to set up sessions to the callee network is implemented.

For instance, by inspecting the destination that is the called party logical name it can be known e.g. that the destination complies to the 3GPP (third Generation Partnership Project) SIP specifications and it is known that always a certain sequence of methods is sent in the session set-up. Similarly, the terminal could inspect the current network to which it is registered to determine the sequence of methods that is going to be used in call set-up.

Further, the terminal device of the caller 1 or the client determines the available space for transmitting the attachment fragments. Preferably, this is performed by using PATH MTU discovery and analyzing average SIP method lengths. Thereby, repeated attempts are possible. Then, the terminal device of the caller 1 or the client fragments the attachment in attachment fragments. Finally, the attachment is sent using MIME message/partial encapsulation.

In conclusion the invention offers an extremely useful feature for imaging capable phones, in particular since good looking images of a comfortable size can be transmitted together with SIP messages. Thus, the invention enables to display images on the terminal device of a callee before the callee's terminal device starts alerting.

It is noted that the present invention is not restricted to the preferred embodiment described above, but can be implemented in any fixed or wireless network environment using any kind of session initiation protocols in packet switched networks as well as in circuit switched networks as well as in combined packet switched and circuit switched networks, in particular in UMTS terminals according to the 3GPP and in set-top-boxes. The number of messages used for transmitting attachment fragments is not limited to the number shown in the embodiments what can be larger as well as smaller, in particular than three or five messages. The preferred embodiment may thus vary within the scope of the attached claims.

The invention claimed is:

1. A method, comprising:
   using a first group of successive session initiation messages of a session initiation protocol to signal attachment data, wherein said attachment data comprises binary data, and wherein said first group of successive session initiation messages comprise an invitation for a terminal to participate in a session, wherein said session initiation protocol is defined to initiate, maintain and terminate sessions with one or more terminals in a packet switched network, and wherein said using comprises
   fragmenting said attachment data in attachment fragments;
   attaching said attachment fragments to said first group of successive session initiation messages;
   filling up a session initiation message of said first group of successive session initiation messages only partly with an attachment fragment, wherein a size of the attachment fragment is not a maximum possible size of the attachment fragment;
   reserving spare space for routing information being added during transmission of said session initiation message of said first group of successive session initiation messages in said packet switched network; and
   sending said first group of successive session initiation messages from a first terminal towards a second terminal in the packet switched network, wherein said attaching said attachment fragments to said first group of successive session initiation messages enables the first group to be sent from the first terminal to the second terminal prior to an alerting phase of said second terminal, wherein the alerting phase comprises a session initiation protocol ringing message from the second terminal.

2. The method according to claim 1, wherein said first group comprises at least one of:
   an INVITE message for inviting said second terminal to participate in a session;
   a PRACK message for acknowledging a provisional response message; and
   a COMET message for providing additional information to said second terminal.

3. The method according to claim 1, wherein said first group comprises a sequence of messages that are always sent during an initiation of successful sessions.

4. The method according to claim 1, wherein said first group comprises:
   an INVITE message for inviting said second terminal to participate in a session; and
   a PRACK message for acknowledging session parameters indicated by said second terminal.

5. The method according to claim 1, wherein said first group comprises:
   an INVITE message for inviting said second terminal to participate in a session; and
   a COMET message for indicating successful resource reservation for session media components.

6. The method according to claim 1, further comprising:
   attaching attachment fragments to a second group of successive session initiation messages, wherein attaching said attachment fragments to said second group enables the second group to be sent from said first terminal to said second terminal after said alerting phase of said second terminal.

7. The method according to claim 6, wherein said second group comprises at least one of:
   a further PRACK message for acknowledging a further provisional response message; and
   an ACK message for acknowledging a 200 OK message indicating a successful request.

8. The method according to claim 1, further comprising evaluating a response message returned from said second terminal to said first terminal in order to determine whether said second terminal supports multiplexed attachment data.

9. The method according to claim 8, further comprising sending a new INVITE message without attachment data from said first terminal to said second terminal if it is determined that said second terminal is not supporting multiplexed attachment data.

10. The method according to claim 1, further comprising determining possible methods for a transmission of attachment fragments based on information about said second terminal.

11. The method according to claim 10, wherein said information is a logical name of said second terminal.

12. The method according to claim 10, wherein said information indicates whether said second terminal complies to a particular session initiation protocol specification, in particular to third generation partnership project session initiation protocol specification, with a certain sequence of methods sent in a session set-up procedure.

13. The method according to claim 1, further comprising discovering the available space for attachment fragments in session initiation messages of said first group of successive session initiation messages prior to the fragmentation of attachments.

14. The method according to claim 13, wherein said discovering further comprises discovering of a maximum packet size between said first terminal and said second terminal.

15. The method according to claim 1, further comprising determining said first group of successive session initiation messages usable for carrying attachment fragments to be received by said second terminal prior to an alerting phase of the second terminal, and prior to said fragmenting of attachments.

16. The method according to claim 15, wherein said determining is based on information of a currently serving network of said first terminal.

17. The method according to claim 15, wherein said determining is based on information on the second terminal.

18. The method according to claim 1, further comprising determining possible methods for a transmission of attachment fragments by inspecting said packet switched network to which at least one of said first terminal and said second terminal is registered.

19. A method, comprising:
   transmitting attachment data of attachments in session initiation messages of a session initiation protocol, wherein said protocol is defined to initiate, maintain and terminate sessions with one or more terminals in a network;
   fragmenting said attachment data in attachment fragments;
   attaching said attachment fragments to successive session initiation messages;
   filling up a session initiation message of said successive session initiation message only partly with an attachment fragment, wherein a size of the attachment fragment is not a maximum possible size of the attachment fragment;
reserving spare space for routing information being added during transmission of said session initiation message of said successive session initiation message in said network; and
determining, by a first terminal, an amount of available space in a session initiation message of said successive session initiation message for transmitting said attachment fragments by analyzing average lengths of session initiation protocol methods being contained in session initiation messages.

20. A method, comprising:
fragmenting attachment data in attachment fragments, wherein said attachment data comprises binary data;
attaching said attachment fragments to a first group of successive session initiation messages of a session initiation protocol;
filling up a session initiation message of said first group successive session initiation messages only partly with an attachment fragment wherein a size of the attachment fragment is not a maximum possible size of the attachment fragment;
reserving spare space for routing information being added during transmission of said session initiation message of said first group of successive session initiation messages in a packet switched network;
transmitting said attachment data in said first group of successive session initiation messages of said session initiation protocol, wherein said first group of successive session initiation messages comprise an invitation for a terminal to participate in a session;
receiving said attachment data of attachments in said first group of successive session initiation messages of said session initiation protocol, said protocol being defined to initiate, maintain and terminate sessions with one or more terminals in said packet switched network;
separating said attachment data from said first group of successive session initiation messages, each session initiation message of said first group of successive session initiation messages including at least an attachment fragment portion and a routing information portion; and
defragmenting said attachment data from thus obtained attachment fragments,
wherein said receiving comprises receiving said first group of successive session initiation messages prior to a terminal of the packet switched network starting an alerting phase, wherein the alerting phase comprises a session initiation protocol ringing message from the terminal.

21. The method according to claim 20, wherein the separating further comprises separating said attachment fragments from a second group of successive session initiation messages that are sent from a first terminal to a second terminal after said second terminal started alerting.

22. An apparatus, comprising:
a processor,
memory including computer program code,
the memory and the computer program code configured, with the processor, to cause the apparatus at least to,
use, at a first terminal device, a first group of successive session initiation messages of a session initiation protocol, wherein said protocol is defined to initiate, maintain and terminate sessions with one or more terminals in a packet switched network, wherein said attachment data comprises binary data, wherein said first group of successive session initiation messages comprise an invitation for a second terminal device to participate in a session, and wherein said using comprises the memory and the computer program code further configured, with the processor, to cause the apparatus at least to
initiate sessions with said one or more terminal devices in said packet switched network;
fragment said attachment data in attachment fragments;
attach said attachment fragments to said first group of successive session initiation messages;
wherein a session initiation message of said first group is filled up only partly with an attachment fragment, a size of the attachment fragment is not a maximum possible size of the attachment fragment, and spare space is reserved for routing information being added during transmission of said session initiation message of said first group in said packet switched network; and
send said first group of successive session initiation messages towards said second terminal device in the packet switched network, wherein said attaching said attachment fragments to said first group of successive session initiation messages enables the first group to be sent from the first terminal device to the second terminal device prior to an alerting phase of said second terminal device, wherein the alerting phase comprises a session initiation protocol ringing message from the second terminal device.

23. The apparatus according to claim 22, the memory and the computer program code further configured to, with the processor, cause the apparatus at least to evaluate a response message received from a further terminal device in order to determine whether said further terminal device supports fragmented attachment data.

24. An apparatus, comprising:
a processor,
memory including computer program code,
the memory and the computer program code configured to, with the processor, cause the apparatus at least to,
transmit attachment data of attachments in session initiation messages of a session initiation protocol, wherein said protocol is defined to initiate, maintain and terminate sessions with one or more terminals in a network;
initiate sessions with said one or more terminal devices in said network;
fragment said attachment data in attachment fragments;
attach said attachment fragments to successive session initiation messages,
wherein a session initiation message of said successive session initiation messages is filled up only partly with an attachment fragment, a size of the attachment fragment is not a maximum possible size of the attachment fragment, and spare space is reserved for routing information being added during transmission of said session initiation message of said successive session initiation messages in said network; and
determine an amount of available space in a session initiation message of said successive session initiation messages for transmitting said attachment fragments by analyzing average lengths of session initiation protocol methods contained in session initiation messages.

25. An apparatus, comprising:
a processor,
memory including computer program code,
the memory and the computer program code configured, with the processor, to cause the apparatus at least to,
receive, at a second terminal device, signaling comprising attachment data of attachments in a first group of successive session initiation messages of a session initiation protocol, wherein said attachment data comprises binary data, and wherein said first group of successive session initiation messages comprise an invitation for a terminal to participate in a session, wherein said session initiation protocol is defined to initiate, maintain and terminate sessions with one or more terminals in a packet switched network, wherein said attachment data is received in said first group of successive session initiation messages of said session initiation protocol before an alerting phase of said second terminal, wherein said attachment data is fragmented in attachment fragments, and said attachment fragments are attached to said first group of successive session initiation messages, and wherein a session initiation message of said first group is filled up only partly with an attachment fragment, a size of the attachment fragment is not a maximum possible size of the attachment fragment, and spare space is reserved for routing information being added during transmission of said session initiation message of said first group in said packet switched network;

initiate sessions with said one or more terminal devices in said packet switched network;

separate said attachment data from said first group of successive session initiation messages, each session initiation message of said first group including at least an attachment fragment portion and a routing information portion, thus obtaining said attachment fragments; and defragment said attachment fragments, wherein the alerting phase comprises at least one of performing a ringing at the second terminal device, and sending a session initiation protocol ringing message to another terminal of the packet switched network.

26. The apparatus according to claim 25, the memory and the computer program code further configured, with the processor, to cause the apparatus at least to, transmit said messages;

initiate sessions with one or more terminal devices in said packet switched network;

fragment said attachment data in attachment fragments; and attach said attachment fragments to successive session initiation messages;

wherein a session initiation message is filled up only partly with an attachment fragment and spare space is reserved for routing information being added during transmission of said session initiation message in said packet switched network.

27. A method, comprising:

using a first group of successive protocol messages of a protocol to signal attachment data, wherein said protocol is defined to initiate, maintain, and terminate sessions with a first terminal and a second terminal in a packet switched network, wherein said attachment data comprises binary data, wherein said first group of successive protocol messages comprise an invitation for a terminal to participate in a session, and wherein said using comprises establishing a session between the first terminal and the second terminal;

determining, by the first terminal, a maximum size of an attachment fragment before transmitting the attachment data;

fragmenting said attachment data into attachment fragments;

attaching said attachment fragments to said first group of successive protocol messages; and filling up a protocol message of said first group of successive protocol messages only partly with an attachment fragment, wherein a size of the attachment fragment is not a maximum possible size of the attachment fragment; and sending from said first terminal said first group of successive protocol messages towards said second terminal in the packet switched network, wherein said attaching said attachment fragments to said first group of successive protocol messages enables the first group to be sent from the first terminal to the second terminal prior to an alerting phase of said second terminal, and wherein the alerting phase comprises a session initiation protocol ringing message from said second terminal.

28. The method of claim 27, further comprising transmitting said attachment data via a server to the second terminal in said packet switched network.

29. The method of claim 27, further comprising identifying the first terminal and the second terminal using user level addresses.

30. The method of claim 27, wherein the attachment data comprises a file.

31. The method of claim 27, further comprising attaching attachment fragments to a second group of successive protocol messages, wherein attaching said attachment fragments to said second group enables the second group to be sent from said first terminal after the second terminal has started alerting.

32. The method of claim 31, wherein said second group comprises at least one of a PRACK and an ACK message.

33. An apparatus, comprising:

a processor, memory including computer program code, the memory and the computer program code configured, with the processor, to cause the apparatus at least to, use a first group of successive protocol messages of a protocol to signal attachment data, wherein said protocol is defined to initiate, maintain, and terminate sessions with the apparatus and a terminal in a packet switched network, wherein said attachment data comprises binary data, and wherein said first group of successive protocol messages comprise an invitation for terminal to participate in a session, wherein said using comprises the memory and the computer program code further configured, with the processor, to cause the apparatus to at least:

establish a session between the apparatus and the terminal;

determine a maximum size of an attachment fragment before transmitting the attachment data;

fragment said attachment data into attachment fragments;

attach said attachment fragments to said first group of successive protocol messages, wherein a protocol message of said first group is filled up only partly with an attachment fragment, and a size of the attachment fragment is not a maximum possible size of the attachment fragment; and send said first group of successive protocol messages towards said terminal, wherein said attaching said attachment fragments to said first group of successive protocol messages enables the first group to be sent from the apparatus to the terminal prior to an alerting phase of said terminal, and wherein the alerting phase comprises a session initiation protocol ringing message from said terminal.

34. The apparatus of claim 33, the memory and the computer program code further configured, with the processor, to cause the apparatus at least to transmit said attachment data via a server to the terminal.

35. The apparatus of claim 33, the memory and the computer program code further configured, with the processor, to cause the apparatus at least to identify the apparatus and the terminal using user level addresses.

36. The apparatus of claim 33, further comprising the memory and the computer program code further configured, with the processor, to cause the apparatus at least to attach attachment fragments to a second group of successive protocol messages, wherein attaching said attachment fragments to said second group enables the second group to be sent from said apparatus to the terminal after the terminal has started alerting.

37. The apparatus of claim 33, wherein said attachment data provides the terminal with additional information about a forthcoming call.

38. An apparatus, comprising:
a processor,
memory including computer program code,
the memory and the computer program code configured, with the processor, to cause the apparatus at least to,
receive attachment data of attachments in a first group of successive protocol messages of a protocol, wherein said protocol is defined to initiate, maintain, and terminate sessions with a terminal and the apparatus in a packet switched network, wherein said attachment data comprises binary data, and wherein said first group of successive protocol messages comprise an invitation for the terminal to participate in a session,
wherein said attachment data is received in said first group of successive protocol messages in said packet switched network,
wherein a session is established between the terminal and the apparatus,
wherein a maximum size of an attachment fragment is determined before the attachment data is determined,
wherein said attachment data is fragmented in attachment fragments,
and wherein said attachment fragments are attached to said first group of successive protocol messages,
wherein a protocol message of said first group of successive protocol messages is filled up only partly with an attachment fragment and a size of the attachment fragment is not a maximum possible size of the attachment fragment;
separate said attachment data from said first group of successive protocol messages, each protocol message of said first group including at least an attachment fragment portion and a routing information portion;
defragment said attachment data from thus obtained attachment fragments, wherein said first group of successive protocol messages is received before an alerting phase by the apparatus, and wherein the alerting phase comprises at least one of a ringing at the apparatus, and a session initiation protocol ringing message from said apparatus.

39. A non-transitory computer readable medium embodying a computer program, the computer program executable by a processor to perform actions comprising:

using a first group of successive protocol messages of a protocol to signal attachment data, wherein said protocol is defined to initiate, maintain, and terminate sessions with a first terminal and a second terminal in a packet switched network, wherein said attachment data comprises binary data, and wherein said first group of successive protocol messages comprise an invitation for a terminal to participate in a session, wherein using comprises
establishing a session between the first terminal and the second terminal;
determining, by the first terminal, a maximum size of an attachment fragment before transmitting the attachment data;
fragmenting said attachment data into attachment fragments;
attaching said attachment fragments to said first group of successive protocol messages;
filling up a protocol message of said first group of successive protocol messages only partly with an attachment fragment, wherein a size of the attachment fragment is not a maximum possible size of the attachment fragment; and
sending said first group of successive protocol messages towards said second terminal in the packet switched network, wherein said attaching said attachment fragments to said first group of successive protocol messages enables the first group to be sent from the first terminal to the second terminal prior to an alerting phase of said second terminal, and wherein the alerting phase comprises a session initiation protocol ringing message from said second terminal.

40. A non-transitory computer readable medium embodying a computer program, the computer program executable by a processor to perform actions comprising:
receiving signaling attachment data of attachments in a first group of successive protocol messages of a protocol, wherein said protocol is defined to initiate, maintain, and terminate sessions with a first terminal and a second terminal in a packet switched network, wherein said attachment data comprises binary data, and wherein said first group of successive protocol messages comprise an invitation for a terminal to participate in a session, wherein receiving comprises
establishing a session between the first terminal and the second terminal in said packet switched network;
receiving, at said second terminal, said attachment data of attachments in said first group of successive protocol messages;
separating said attachment data from said first group of successive protocol messages, each protocol message of the first group including at least an attachment fragment portion and a routing information portion; and
defragmenting said attachment data from thus obtained attachment fragments,
wherein said receiving comprises receiving said first group of successive protocol messages prior to an alerting phase by said second terminal, and wherein the alerting phase comprises a session initiation protocol ringing message from said second terminal.

* * * * *